2,864,668

URANIUM EXTRACTION PROCESS

Willis H. Baldwin and Cecil E. Higgins, Oak Ridge, Tenn., assignors to the United States of America as represented by the United States Atomic Energy Commission No Drawing. Application November 23, 1956
Serial No. 624,179

8 Claims. (Cl. 23—14.5)

Our invention relates to a method for removing uranium values from aqueous solutions and particularly to an improved liquid-liquid extraction process for removing uranium values from acidic aqueous solutions.

The prior art liquid-liquid uranium extraction processes required the use of salting agents to drive the uranium values into the organic phase. For instance, in extracting uranium values with tributyl phosphate, ethers, ketones and aldehydes, it was necessary to incorporate a high concentration of nitric acid or metallic nitrates in the aqueous phase. Even with salting agents present the extraction power of the prior art extractants was relatively low and several extraction stages were required in order to remove substantially all the uranium from the aqueous phase.

One object of our invention is to provide new and improved extractants for uranium values.

Another object of our invention is to provide new and improved extractants for uranium values which will extract uranium from aqueous solutions without requiring that there be a high concentration of salting agents present in the aqueous phase.

Still another object of our invention is to provide extractants for uranium values which form strong complexes with uranium.

We have found that the group of organo-phosphorus compounds comprised of the phosphonates, phosphinates, and phosphine oxides will extract uranium values from acidic aqueous solutions even when the aqueous solution has but a minor proportion of other salts present. Certain of the compounds form such strong complexes with uranium that the extraction of uranium values is substantially quantitative in one extraction stage.

Our invention accordingly provides for the removal of uranium values from an acidic aqueous solution containing said values by a process which comprises contacting said solution with an organic solution comprised of a substantially water-immiscible organic diluent and a member selected from the group having the formula

where R is selected from the group consisting of alkyl radicals, aryl radicals, and aralkyl radicals, R' is selected from the group consisting of alkyl radicals, aryl radicals, aralkyl radicals, alkoxy radicals, and aralkoxy radicals, and the total number of carbon atoms in the member is at least 12, whereby uranium values are extracted into the organic phase, and separating the resulting uranium loaded organic phase from the remaining aqueous solution.

In the preferred form of our invention the active reagent is dissolved in an inert organic diluent. The diluent to be used must meet certain requirements, and the most important ones are (1) immiscibility with the aqueous solution, (2) ability to dissolve the organo-phosphorus compound and the extracted uranium complex, (3) freedom from interfering reaction with the organo-phosphorus compound, and (4) suitable density and viscosity for ready separation from the organic phase. Carbon tetrachloride and petroleum hydrocarbon fractions such as kerosene are suitable diluents.

The concentration of extractant in the organic phase may be varied over a wide range. The upper limit of extractant concentration is determined by the solubility of the extractant in the diluent. The lower limit is determined by the desired uranium-loading in the organic phase. Not only is there a stoichiometric limit of one mole of uranium to two moles of the extractant but the extraction power decreases with a decrease in concentration. Suitable extractant concentrations are from below 0.05 molar to over 1.0 molar.

The ratio of the volume of the aqueous phase to the volume of the organic phase may be varied over a wide range. Among the factors affecting the choice of phase ratio are (1) the desired uranium loading in the organic phase, (2) the uranium concentration in the aqueous phase, (3) the extraction power of the extractant and (4) the extractant concentration in the organic phase. For some purposes it may be desirable to have the volume of organic phase greater than the volume of the aqueous phase. In more common situations it is desirable to have the volume of organic phase less than the volume of the aqueous phase. Suitable phase ratios may be from less than 0.02 volume of organic phase per volume of aqueous phase up to 1 volume of organic phase per volume of aqueous phase.

The choice of extraction reagents for a particular process depends upon a number of factors and one of the important ones is the extraction power of the reagent being considered. The data in the following table illustrates the extraction powers of several reagents for uranium values from an aqueous nitrate solution:

TABLE I

*Extraction of uranyl nitrate by organo-phosphorus compounds*

Organic phase: 0.75 M compound in $CCl_4$
Aqueous phase: 0.1 M $UO_2(NO_3)_2$
Phase ratio: 1:1

| Reagent | 0.0 M $HNO_3$, Uranium Extracted (percent) | 0.6 M $HNO_3$, Uranium Extracted (percent) | 3 M $HNO_3$, Uranium Extracted (percent) |
|---|---|---|---|
| Dibutyl butylphosphonate | 55 | 97 | 99.4 |
| Butyl dibutylphosphinate | 98.5 | 99.9 | 99.9 |
| Tributyl phosphine oxide | 99.7 | 99.9 | 99.9 |
| Tributyl phosphate | 11 | 56 | 96.5 |

As can be seen from the data in Table I the extraction power of tributyl phosphate for uranium is relatively low from a solution of substantially pure uranyl nitrate and increases as the concentration of nitrate ion is increased. In general, the extraction power increases as the number of carbon to phosphorus bonds increases. The tributyl phosphine oxide extracts substantially all the uranium values from all solutions. The organo-phosphorus compounds having longer chains than those for which data are given in Table I have high extraction powers for uranium values, and the choice to be made between the various compounds will depend on the particular process under consideration. Requirements on physical and chemical properties such as volatility, inflammability and viscosity may limit the usefulness of reagents that have high extraction powers. Examples of other suitable compounds are: trioctyl phosphine oxide, tridecyl phosphine oxide, tridodecyl phosphine oxide, triphenyl phosphine oxide, tri-β phenylethyl phosphine oxide, tris-(γ phenylpropyl) phosphine oxide, tritolyl phosphine oxide, tris-(dimethyl phenyl) phosphine oxide, trinaphthyl phosphine oxide, octyl dioctylphosphinate, decyl didecylphosphinate, dodecyl didodecylphosphinate, phenyl diphenylphosphinate, β phenylethyl bis-(β phenylethyl)-phosphinate, γ phenylpropyl bis-(γ phenylpropyl)-phosphinate, tolyl ditolylphosphinate, naphthyl dinaphthylphosphinate, dioctyl octylphosphonate, didecyl decylphosphonate, didodecyl dodecylphosphonate, diphenyl phenyplhosphonate, bis-(β phenylethyl) β phenylethylphosphonate, bis-(γ phenylpropyl) γ phenylpropylphosphonate, ditolyl tolylphosphonate, dinaphthyl naphthylphosphonate, octyl dibutylphosphinate, octyl didodecylphosphinate, butyl diphenylphosphinate, dioctyl butylphosphonate, didecyl dodecylphosphonate, didodecyl phenylphosphonate, diphenyl tolyl phosphonate.

The data in the following tables illustrate the extraction power of several reagents for uranium values from sulfate and chloride solutions.

TABLE II

*Extraction of uranyl sulfate by organo-phosphorus compounds*

Organic phase: 0.75 M compound in $CCl_4$
Aqueous phase: 0.1 M $UO_2SO_4$

| Reagent | Sulfuric Acid Concentration | |
|---|---|---|
| | 0 M, Uranium Extracted, percent | 2 M, Uranium Extracted, percent |
| Tributyl phosphate | 0.001 | 0.001 |
| Dibutyl butylphosphonate | 0.1 | 0.02 |
| Butyl dibutylphosphinate | 16 | 48 |
| Tributyl phosphine oxide | 95 | 96.8 |

TABLE III

*Extraction of uranyl chloride by organo-phosphorus compounds*

| Reagent | Hydrochloric Acid Concentrations | |
|---|---|---|
| | 0 M, Uranium Extracted (percent) | 1 M, Uranium Extracted (percent) |
| Tributyl Phosphate | 0.3 | 0.8. |
| Dibutyl butylphosphonate | 1 | 26. |
| Butyl dibutylphosphinate | 40 | 92. |
| Tributyl phosphine oxide | 90 | all precipitated. |

As can be seen from the data in Tables II and III the extraction power of tributyl phosphate for uranium values from sulfuric acid or hydrochloric acid solutions is extremely low, the extraction power of the organo-phosphorus compounds having at least one carbon to phosphorus bond being much higher, the extraction power increasing with the number of carbon to phosphorus bonds until the extraction with tributyl phosphine oxide is substantially quantitative.

Any suitable liquid-liquid contacting means such as a mixer-settler device or an extraction column may be used.

The following example illustrates in detail the process of our invention.

EXAMPLE I 5 ml. of an aqueous phase containing 0.1 molar uranyl nitrate was placed with 5 ml. of an organic phase comprised of 0.75 molar tributyl phosphine oxide in carbon tetrachloride. The two phases were thoroughly mixed for thirty minutes, and were then separated. Approximately 99.7 percent of the uranium transferred to the organic phase. The organic reagent and diluent were driven off by heating and the residue was comprised of $U_3O_8$.

The above example is intended to be merely illustrative and our invention should be limited only as is indicated by the appended claims.

It is obvious that these uranium extractants are useful in analytical work and the recovery of uranium values on a large scale is possible by the incorporation of suitable methods of recovery of uranium values from the organic phase.

Having thus described our invention we claim the following:

1. A process for recovering uranium values from an acidic aqueous solution containing said values which comprises contacting said solution with an organic solution comprised of a substantially water-immiscible organic diluent and a member selected from the group having the formula

where R is selected from the group consisting of alkyl radicals, aryl radicals, and aralkyl radicals, R' is selected from the group consisting of alkyl radicals, aryl radicals, aralkyl radicals, alkoxy radicals, and aralkoxy radicals, and the total number of carbon atoms in the member is at least 12, whereby uranium values are extracted into the organic phase, and separating the resulting uranium-loaded organic phase from the remaining aqueous solution.

2. The process of claim 1 wherein the aqueous acidic solution contains ions selected from the group consisting of nitrate, chloride, and sulfate ions.

3. The process of claim 1 wherein the organic solution is comprised of a substantially water-immiscible organic diluent and a member selected from the group having the formula

where R is selected from the group consisting of alkyl radicals, aryl radicals, and aralkyl radicals.

4. The process of claim 1 wherein the organic solution is comprised of a substantially water-immiscible organic diluent and tributyl phosphine oxide.

5. The process of claim 1 wherein the organic solution is comprised of a substantially water-immiscible organic diluent and a member selected from the group having the formula

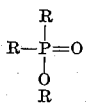

where R is selected from the groups consisting of alkyl radicals, aryl radicals and aralkyl radicals.

6. The process of claim 1 wherein the organic solution is comprised of a substantially water-immiscible organic diluent and butyl dibutylphosphinate.

7. The process of claim 1 wherein the organic solution is comprised of a substantially water-immiscible organic diluent and a member selected from the group having the formula

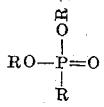

where R is selected from the groups consisting of alkyl radicals, aryl radicals and aralkyl radicals.

8. The process of claim 1 wherein the organic solution is comprised of a substantially water immiscible organic diluent and dibutyl butylphosphonate.

References Cited in the file of this patent

UNITED STATES PATENTS 2,764,471    Kinger et al. _____ Sept. 25, 1956